(12) United States Patent
Breyvogel et al.

(10) Patent No.: US 6,217,062 B1
(45) Date of Patent: *Apr. 17, 2001

(54) VEHICLE SEAT AIR BAG ARRANGEMENT

(75) Inventors: Jörg Breyvogel, Lehre; Ruprecht Sinnhuber, Gifhorn, both of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/552,016

(22) Filed: Apr. 19, 2000

Related U.S. Application Data

(63) Continuation of application No. PCT/EP98/05776, filed on Sep. 10, 1998.

(30) Foreign Application Priority Data

Oct. 20, 1997 (DE) ............................................. 197 46 234

(51) Int. Cl.[7] .................................................. B60R 21/20
(52) U.S. Cl. .................................... 280/730.2; 280/728.2; 297/216.13
(58) Field of Search ............................. 280/728.1, 728.2, 280/730.1, 730.2, 733; 297/216.13, 216.1

(56) References Cited

U.S. PATENT DOCUMENTS

| | | | |
|---|---|---|---|
| 5,464,246 | * 11/1995 | Castro et al. | 280/730.2 |
| 5,503,428 | 4/1996 | Awotwi et al. | 280/730.2 |
| 5,542,696 | * 8/1996 | Steffens, Jr. et al. | 280/730.2 |
| 5,547,214 | 8/1996 | Zimmerman, II et al. | 280/730.1 |
| 5,826,938 | * 10/1998 | Yanase et al. | 297/216.13 |
| 5,860,673 | 1/1999 | Hasegawa et al. | 280/730.2 |
| 5,918,943 | 7/1999 | Mitschelen et al. | 297/452.18 |
| 5,951,039 | * 9/1999 | Severinski et al. | 280/730.2 |
| 6,089,594 | * 7/2000 | Hasegawa et al. | 280/730.2 |

FOREIGN PATENT DOCUMENTS

| | | |
|---|---|---|
| 1962262 | 9/1970 | (DE) . |
| 295 10 608 U | 10/1995 | (DE) . |
| 19505216 | 2/1996 | (DE) . |
| 296 01 257 U | 4/1996 | (DE) . |
| 19541777 | 10/1996 | (DE) . |
| 19639008 | 3/1997 | (DE) . |
| 19538657 | 4/1997 | (DE) . |
| 19642938 | 5/1997 | (DE) . |
| 19646698 | 5/1997 | (DE) . |
| 19649197 | 6/1997 | (DE) . |
| 19622662 | 8/1997 | (DE) . |
| 19704290 | 8/1998 | (DE) . |
| 0733518 | 9/1996 | (EP) . |
| 0788940 | 8/1997 | (EP) . |
| 2293355 | 3/1996 | (GB) . |
| 2296476 | 7/1996 | (GB) . |

* cited by examiner

*Primary Examiner*—Lanna Mai
*Assistant Examiner*—Ruth Ilan
(74) *Attorney, Agent, or Firm*—Baker Botts L.L.P.

(57) ABSTRACT

A vehicle seat air bag arrangement has a side operating air bag module including a gas generator, an air bag package and a gas delivery device which connects the gas generator to the air bag package. The vehicle seat has a backrest part and a seat part each having a frame with frame members constructed in such a way that they can accommodate air bag module components providing a very packed and secure accommodation of air bag module parts which has a favorable effect on driving safety and production costs.

12 Claims, 4 Drawing Sheets

VEHICLE SEAT AIR BAG ARRANGEMENT

REFERENCE TO RELATED APPLICATION

This application is a continuation of International Application No. PCT/EP98/05776 filed Sep. 10, 1998.

BACKGROUND OF THE INVENTION

This invention relates to vehicle seat arrangements containing at least one side-operating air bag module which includes a gas generator, an air bag package, and a gas delivery device connecting the gas generator and the air bag package and also including a backrest and a seat component connected to the backrest, with the backrest and/or the seat component having a frame consisting of connected frame members.

As used herein, the term "air bag package" means a unit which includes one or more folded air bags with or without a container.

A conventional vehicle seat having a head support is disclosed, for example, in German Patent No. 196 22 662, in which a side-operating air bag module is located in the head area. In this case, an air bag package and a gas generator are connected by a gas delivery device, in which the gas is delivered through a hollow head support rod. The hollow head support rod itself may be used as a gas delivery tube or it may contain a separate gas delivery tube. In this case, the gas generator is located in the backrest, but the reference does not describe any arrangement for accommodating the gas generator.

German Offenlegungsschrift No. 195 05 216 also discloses an air bag module arrangement in which, due to space considerations, the gas generator is located in the seat or in one side of the vehicle separated from the air bag, and the gas is supplied to the air bag through connecting tubes. In this case as well, there is no description of any arrangement for accommodating the gas generator.

SUMMARY OF THE INVENTION

Accordingly, it is an object of the present invention to provide a vehicle seat air bag arrangement which overcomes disadvantages of the prior art.

Another object of the invention is to provide a vehicle air bag arrangement that makes it possible to accommodate an air bag module in a space-saving and functionally safe manner.

These and other objects of the invention are attained by providing a vehicle seat air bag arrangement including at least one seat frame member which is shaped to accommodate a gas generator and/or an air bag package. The gas generator and/or the air bag package can therefore be mounted in the vehicle seat in a highly space-saving manner, with appropriately shaped frame members making it possible to simultaneously provide secure support and increased protection of the sensitive components of the air bag module.

In an advantageous embodiment of the invention the vehicle seat includes a backrest part and a seat part each containing a seat frame made of frame members and at least one seat frame member is shaped so that it can be used directly as a gas delivery device. This reduces the required number of parts and simultaneously improves the stability of the gas delivery device, which conventionally consists of a tube or a thin lance.

In a further advantageous embodiment of the invention at least one frame member has a hollow shape formed by internal high-pressure molding. Such shaped frame members can be produced in a highly economic and precise manner and can be provided, for example, with required air bag module component accommodation openings without requiring subsequent processing.

In a highly advantageous embodiment of the invention, the frame of the seat backrest part of the seat includes at least two vertical side frame members and two horizontal frame members, and an air bag package is located in one vertical side frame member and the gas generator is located in another frame member. In this case, for example, the gas generator may be placed in a horizontal frame member of the backrest part or in the other vertical side frame member of the backrest. Thus, the gas generator is kept at a sufficient distance from the air bag package, i.e., away from the immediate collision danger area, which considerably increases the functional safety of the air bag module in the event of deployment. If the gas generator is located in the lower horizontal frame member of the backrest part, the torque acting on the seat fittings during activation is minimized.

In another preferred embodiment of the air bag package, the package is fitted into a bag-like recess in a side frame member of a seat frame which may be in either the backrest part or the seat part. In this case, the air bag package should preferably include a support mounting that may be advantageously constituted by an essentially surrounding flange. In this manner, the air bag package can be mounted in a highly space-saving manner in the side of the seat frame, thus guaranteeing secure support and the greatest possible protection of the air bag package by the frame member.

The air bag arrangement of the invention may be incorporated into a previously established seat production process with relatively little difficulty since the original seat design is largely retained, with the exception of a selective modification of individual components. In addition, the separate mounting of the gas generator and air bag package in the frame members of a seat frame provides an extremely flat design, with the result that, in incorporating the seat designed according to the invention into vehicle models in production and/or for retrofitting or backfitting into vehicles already made, interference problems with adjacent built-in or wall components are not encountered.

It should also be emphasized that the invention may be used to implement a variety of safety concepts. For example, one air bag package location in the backrest frame of the backrest part can be designed for protection of the chest and/or head of a seat occupant while effective pelvic protection can be provided by mounting an air bag package in a frame member of the seat part of the vehicle seat.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
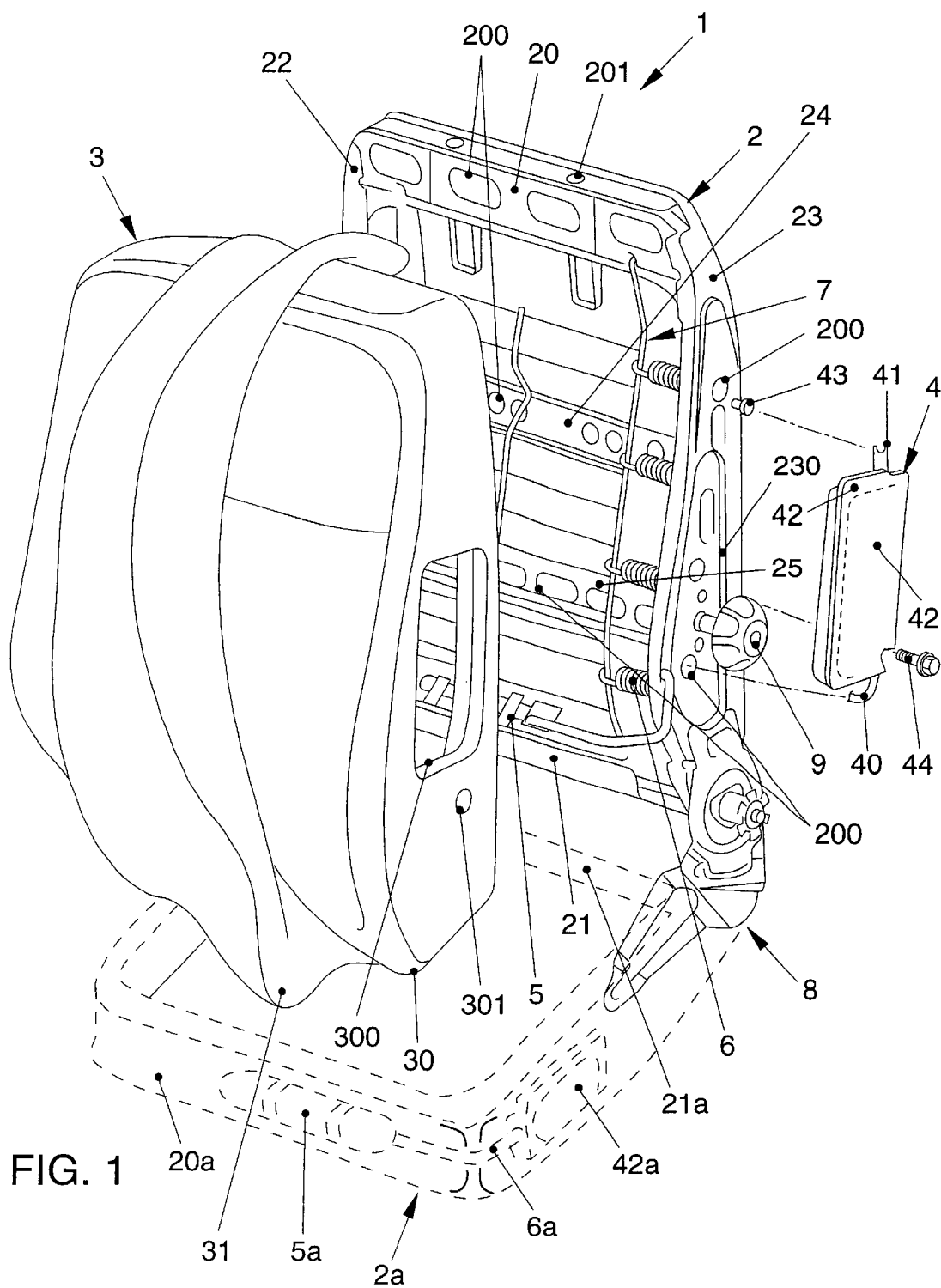
FIG. 1 is a perspective view illustrating a representative embodiment of a vehicle seat air bag arrangement according to the invention, partially in exploded view.

Referring first to the typical embodiment of the invention shown in FIG. 1, the perspective view shows a vehicle seat 1 according to the invention which includes a backrest part having a frame 2 and padding 3 supported by the frame 2 as well as a seat part frame 2a.

The backrest part frame 2 includes an upper outer horizontal frame member 20 and a lower outer horizontal frame member 21. The horizontal frame members 20 and 21 are connected to each other by two vertical side frame members 22 and 23. Between the two outer horizontal frame members 20 and 21, two transverse frame members 24 and 25, placed in a substantially horizontal orientation, are provided for stabilization of the backrest frame 2. The backrest frame 2 is preferably manufactured by internal high-pressure molding, with its frame members, for example, being formed with a U- or C-shaped cross-section, the open sides of which partially face each other. Moreover, the frame members 20, 21, 22, 23, 24 and 25 are formed with openings 200 that contribute to reduction of the material and the weight of the backrest frame 2. The openings 200 may, for example, be in the form of circular or oblong holes. The frame 2a of the seat part has opposite side frame members, a front horizontal frame member 20a and a rear horizontal frame member 21a.

On the upper outer horizontal frame member 20 of the backrest part, holes 201 are provided in order to accommodate retaining straps for a head support that is not shown in further detail. Moreover, a spring-mounted back support 7 is mounted in the backrest frame 2 to provide the padding 3 mounted on the backrest frame 2 with the necessary elasticity. A similar spring mounted support and similar padding (not shown) are provided for the frame 2a of the seat part.

FIG. 1 also shows a recess 230 in the vertical side frame member 23 for at least partially accommodating an air bag package 4 containing a folded air bag that is not shown in further detail in FIG. 1 and should preferably be in the shape of a pillow. The air bag package 4 has a roughly rectangular outline and, in the illustrated embodiment, includes an oblong box-type body. Moreover, the air bag package 4 is provided with a surrounding flange 42 that constitutes a mounting aid or support for the air bag package 4 on the vertical side frame member 23. On the upper transverse side of the air bag package 4, an eyelet-like opening 41 is provided that is used for adjustment on a pin-type mounting element 43 provided on the side of the vertical side frame member. In order to fasten the air bag package 4 to the frame member 23, a screw 44 is provided. Of course, mounting of the air bag package 4 in another manner, for example using snap-in connections or flexible spring elements, is also possible.

On the lower transverse side of the air bag package 4, a tube-like connecting piece 40 is provided for attachment of a connecting tube 6 that connects the air bag package 4 to a gas generator 5. In this embodiment, the gas generator 5 is mounted in the lower horizontal frame member 21 of the backrest frame 2.

In the seat part frame 2a an air bag package 42a is mounted in the side member of the frame 2a while a gas generator 5a is mounted in a front horizontal frame member 20a for convenient replacement and is connected to the air bag package 42a by a connecting tube 6a.

Because the gas generator 5 is separated from the air bag located in the air bag package 4 or 42a, the air bag package takes up only a small amount of space and the separation obviates the need to accommodate the gas generator 5 or 5a in the same frame member containing the air bag package. Therefore, even in situations of extremely cramped space, for example, when the distance between the B pillar or the driver-side door and the vehicle seat 1 is short, side air bag protection can be provided or retrofitted with little difficulty.

It should also be noted that the placement of the gas generator 5 or 5a at a location separated from the air bag, such as in the lower horizontal frame member 21 of the backrest part or the front frame member 20a of the seat part, allows highly reliable mounting of the gas generator 5 or 5a at a safe distance from the possible collision damage, thus providing a high degree of functional safety and reliability in initial deployment of the air bag.

After the air bag package 4 has been mounted on the vertical side frame member 23, the connecting piece 40 extends through one of the openings 200 in the frame member. The padding 3, consisting of a flexible supporting body 30 and a cover 31, which is shown partially removed in FIG. 1, is attached to the backrest frame members 20–23, with the supporting body 30 having an opening 300 with an outline roughly corresponding to the outline of the air bag package 4. Below the opening 300, a hole 301 permits partial insertion of a shaft for a control handle 9 for adjusting the inclination of the backrest frame 2. In this case, the backrest frame 2 is connected in a movable manner by seat fittings 8 to a seat component frame that is not shown in further detail.

Figure 2:
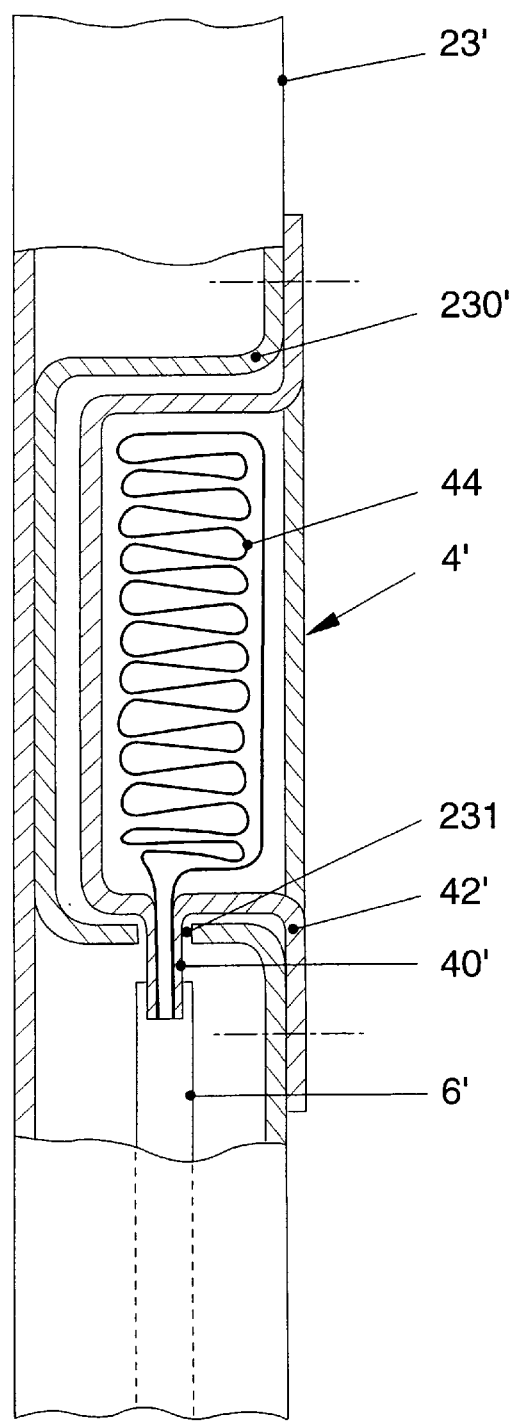
FIG. 2 is a partial vertical sectional view through a peripheral vertical frame member of a backrest part in the region of a mounted air bag package.

FIG. 2 shows a cutaway view of a vertical side frame member 23' of a backrest frame, which is provided with a recess 230'. The recess 230' is molded into the vertical frame member 23', for example, by the process of internal high-pressure molding, and almost completely accommodates an air bag package 4'. The only support or attachment to the vertical side frame member 23' is effected by a surrounding flange 42', similar to the surrounding flange 42 of the air bag package 4 in FIG. 1, Inside the air bag package 4', there is a folded air bag 44', which is connected by a connecting line 6' to a gas generator not shown in further detail. The connecting line 6' is connected to the air bag package 4' by a tube-like connecting piece 40'. In this case, the connecting piece 40' extends through a hole 231 in the lower horizontal wall of the recess 230'.

Figure 3:
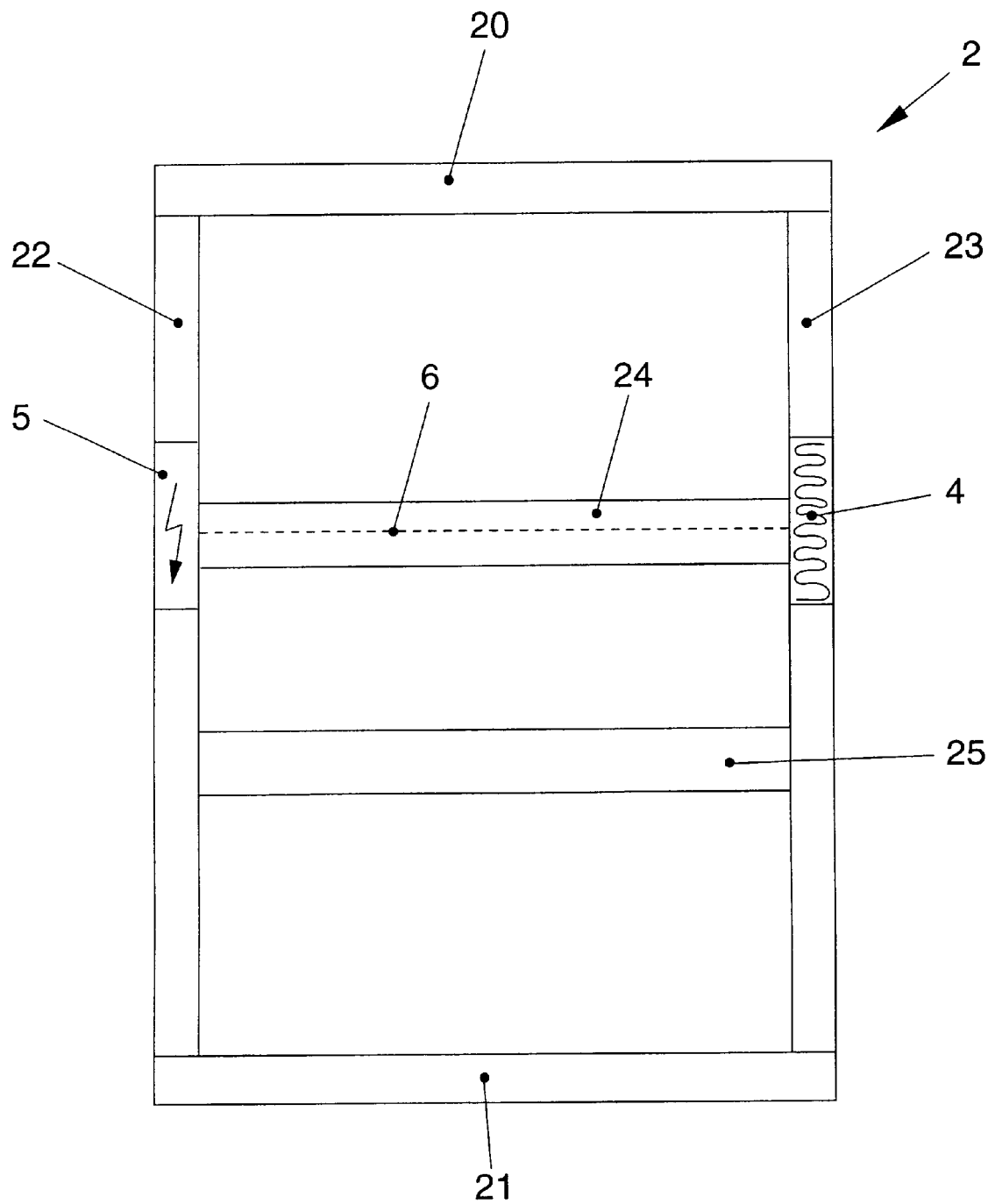
FIG. 3 is a schematic view showing the backrest frame with an air bag module installed.

FIG. 3 schematically depicts a further possible arrangement of an air bag module for the backrest part of a vehicle seat of the type shown in FIG. 1 including the gas generator 5, the connecting line 6, and the air bag package 4. In connection with the backrest frame 2 shown in FIG. 3, it should be noted that a circular, oval, or rectangular tube shape may be used as a starting material or semifinished product in manufacturing the frame members of the backrest frame 2, as well as the seat frame, which is not shown. To make the frame, the tube is first molded in raw form using bending tools and then given its final frame shape using internal high-pressure molding. By using an internal high-pressure molding tool, functional shapes such as recesses, flanges, or corners may be manufactured directly from the wall material of the hollow tube. The seat frame 2a may be made in a similar manner.

In the arrangement shown in FIG. 3, the air bag package 4 is positioned in the vertical side frame member 23, which should be located facing a driver's side door or passenger's side door or B pillar, not shown in the figure. The gas generator 5 is placed on the opposite side of the backrest frame 2, preferably in the other vertical side frame member 22. The gas generator 5 and the air package 4 are connected to each other through a connecting line 6, which in this case extends through the upper transverse frame member 24.

Figure 4:
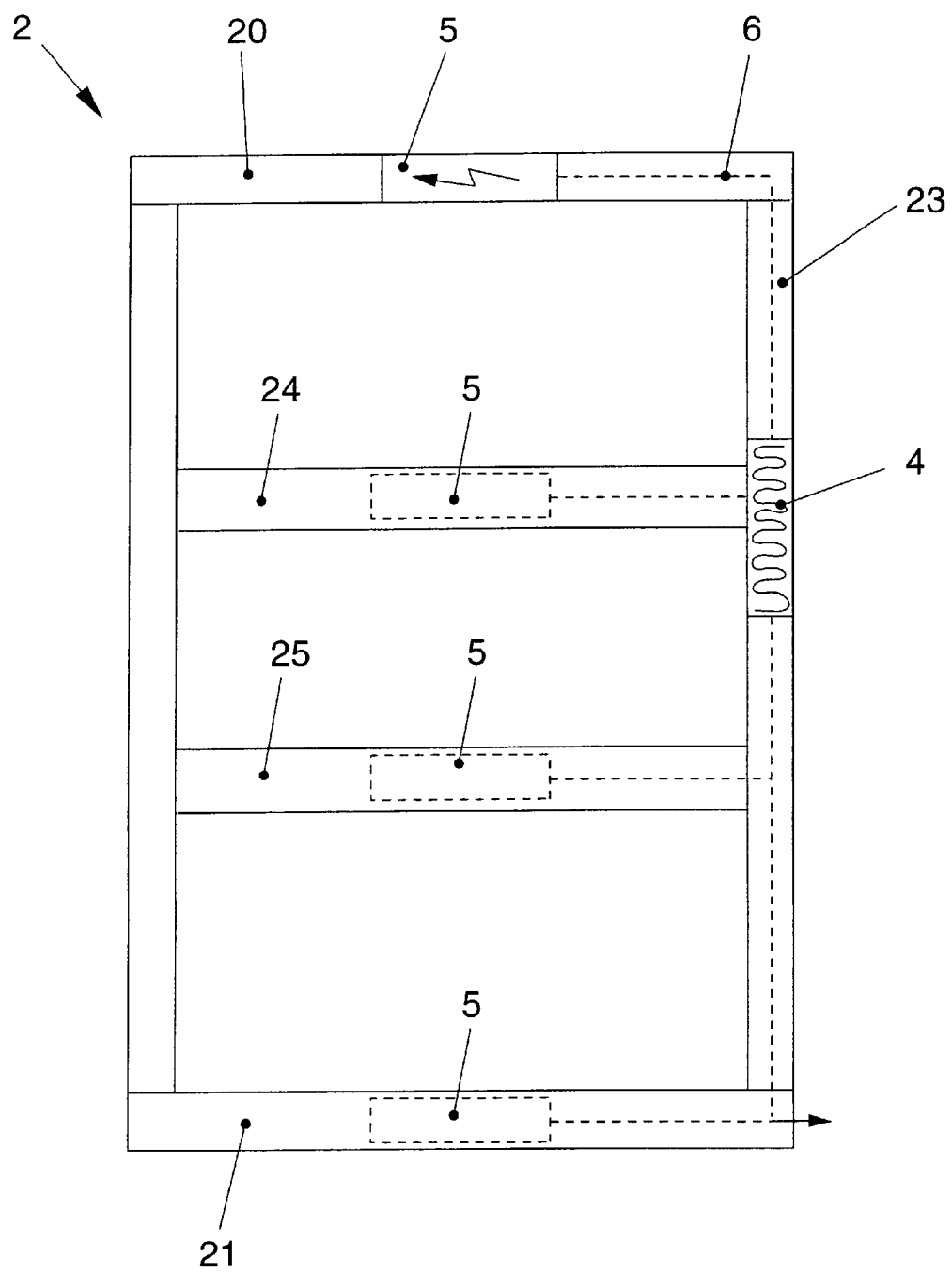
FIG. 4 is a schematic view of the backrest frame with additional possible components of the air bag module.

FIG. 4 shows additional alternative locations for the air bag module components in the backrest frame 2 consisting of a gas generator 5, an air bag package 4, and a connecting line 6. In this case, the gas generator 5 is mounted in the upper horizontal frame member 20 and is connected through the connecting line 6 to the air bag package 4 placed in the vertical frame member 23. Dotted lines indicate additional preferred positions for the location of the gas generator 5 directly in the other frame members of the backrest frame 2. For example, the gas generator 5 can also be placed in the upper transverse frame member 24, the lower transverse frame member 25, or the lower horizontal frame member 21 as shown in FIG. 1. In this case, it should be noted that placing the gas generator 5 in the lower horizontal frame member 21 results in a minimal torque load on the seat fittings 8 provided in the region of the horizontal frame member 21 upon activation.

The preferred arrangements of the gas generator 5 and the air bag package 4 shown in FIGS. 3 and 4 allow space-saving and functionally safe placement of the air bag module components making use of the frame members of the backrest frame 2, thus making it possible to accommodate the gas generator in a safe and functionally appropriate position farther away from the possible center of impact during a collision. In this case, the gas generator 5 and the air bag package 4, for example, may be positioned in a manner comparable to that shown in FIG. 2.

It is possible to construct at least one of the seat frame components of the seat frame 2 for the backrest part or the seat frame 2a of the seat part between the gas generator 5 or 5a and the air bag package 4 or 42a so that a type of connecting channel is formed, with the result that one frame member, for example, the transverse frame member 24 according to FIG. 3 or FIG. 4, or the front horizontal frame member 20a of FIG. 1 can provide the function of the connecting line 6, which is not shown. This would result in a further reduction in the number of components. Instead of the connecting line 6, a lance-type connecting tube or comparable arrangement is of course also possible.

Although the invention has been described herein with reference to specific embodiments, many modifications and variations therein will readily occur to those skilled in the art. Accordingly, all such variations and modifications are included within the intended scope of the invention.

We claim:

1. A vehicle seat air bag arrangement comprising a seat having a backrest part and a seat part connected to the backrest part, at least one of the backrest part and the seat part containing a frame made of a plurality of frame members including a side frame member and a horizontal frame member, and at least one side-operating air bag module including a gas generator, an air bag package located at a distance from the gas generator, and a gas delivery device connecting the gas generator to the air bag package, the air bag package being mounted in a side frame member and the gas generator being mounted in another frame member.

2. A vehicle seat air bag arrangement according to claim 1 wherein at least one frame member is formed, at least in part, to constitute a gas delivery device.

3. A vehicle seat air bag arrangement according to claim 1 wherein at least one frame member has, at least in part, a hollow shape produced by internal high-pressure molding.

4. A vehicle seat air bag arrangement according to claim 1 wherein the gas generator is mounted in a horizontal frame member of the frame.

5. A vehicle seat air bag arrangement according to claim 4 wherein the gas generator is mounted in a lower horizontal frame member of a frame for the backrest part.

6. A vehicle seat air bag arrangement according to claim 4 wherein the gas generator is mounted in a front horizontal frame member of the seat part.

7. A vehicle seat air bag arrangement according to claim 1 wherein the gas generator is mounted in a second side frame member of the frame.

8. A vehicle seat air bag arrangement according to claim 1 wherein the air bag package is fitted into a recess of the side frame member.

9. A vehicle seat air bag arrangement according to claim 1 wherein the air bag package includes support means in the form of an essentially surrounding flange.

10. A vehicle seat air bag arrangement according to claim 1 wherein the gas generator includes a housing that is, at least in part, an integral component of one of the frame members.

11. A vehicle seat air bag arrangement according to claim 1 wherein both the backrest part and the seat part include a frame having side frame members and horizontal frame members and including an air bag package mounted in a side frame member of each frame and a gas generator mounted in a horizontal frame member of each frame.

12. A vehicle seat air bag arrangement according to claim 11 wherein a gas generator is mounted in a front horizontal frame member of the seat part and a gas generator is mounted in a lower horizontal frame member of the backrest part.

* * * * *